United States Patent [19]

Engeler et al.

[11] Patent Number: 4,843,887

[45] Date of Patent: Jul. 4, 1989

[54] METHOD AND DEVICE FOR MEASURING PRESSURES IN TUBULAR BODIES

[75] Inventors: Paul Engeler, Frauenfeld; Peter Wolfer, Kleinandelfingen, both of Switzerland

[73] Assignee: Kistler Instrumente Aktiengesellschaft, Winterthur, Switzerland

[21] Appl. No.: 154,224

[22] Filed: Feb. 10, 1988

[30] Foreign Application Priority Data

Feb. 11, 1987 [EP] European Pat. Off. ........ 87101897.4
Mar. 4, 1987 [EP] European Pat. Off. ........ 87103017.7

[51] Int. Cl.[4] .......................... G01L 7/04; G01L 9/08
[52] U.S. Cl. .................................... 73/730; 73/119 A
[58] Field of Search ................ 73/730, 119 A, 167, 73/DIG. 4, 754

[56] References Cited

U.S. PATENT DOCUMENTS 2,420,148 5/1947 Ostergren .......................... 73/730
4,425,800 1/1984 Claassen et al. .................. 73/730
4,738,140 4/1988 Kempf ................................. 73/730

FOREIGN PATENT DOCUMENTS 2019007 10/1979 United Kingdom ............... 73/730

Primary Examiner—Donald O. Woodiel
Attorney, Agent, or Firm—Barnes & Thornburg

[57] ABSTRACT

A method and a device for measuring the pressure in a tubular body, for example, in the nozzle of a plastics injection molding machine, in the injection pumps of diesel engines, in gun barrels and the like, makes use of electromechanical transducers of piezoelectric, piezoresistive or strain gauge type to detect the radial and tangential mechanical stresses $\sigma_r$, $\sigma_t$ in the tube cross section. The output signals $s_r$, $s_t$ of the transducers are fed to a signal processing facility consisting of a subtraction circuit (for transducers of like polarity) or an addition circuit (for transducers of unlike polarity). The output signal of the signal processing facility is proportional to the difference between the pressures inside and outside the tubular body and may be fed to a further evaluation facility, such as a pressure display or process control device. The invention makes possible the exact measurement of the pressure inside a tubular body without contact with the pressure medium, and excludes disturbing influences as may arise due to temperature gradients, longitudinal stresses and the like.

21 Claims, 6 Drawing Sheets

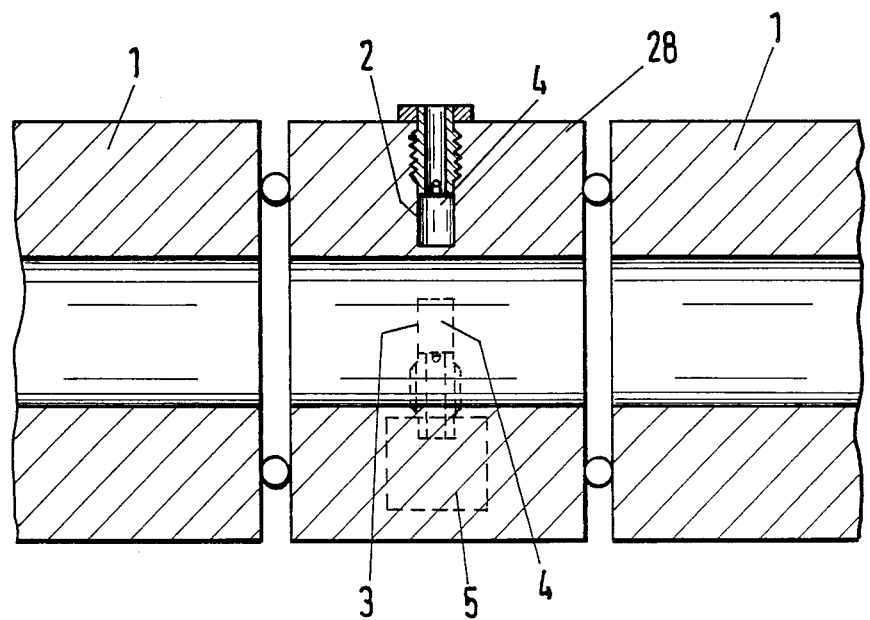

METHOD AND DEVICE FOR MEASURING PRESSURES IN TUBULAR BODIES

BACKGROUND AND SUMMARY OF THE INVENTION

This invention relates to a method and a device for measuring the pressure inside tubular bodies.

Such tubular bodies are employed typically as nozzles of plastics injection-molding machines, as injection pumps on diesel engines, and as gun barrels. Gases or liquids flow through them, and the most important variable to be measured is usually the internal pressure, either to protect connected equipment against overloading or to monitor or control a process. Often the gases or liquids in question are hot, as is the case with all the above-named applications, presenting special meteorological difficulties.

Pressure is measured more or less directly in all the above-mentioned applications. In ballistics, for example, a pressure transducer is fitted radially into a hole drilled in the gun barrel and passing right through the wall. The transducers have a diaphragm which is in direct contact with the explosion gases. This has the disadvantage that the delicate part of the transducer is exposed to highly corrosive gases, shortening its life. Furthermore, the temperature rise during the explosion causes mechanical stresses in the barrel wall, which may falsify the measurement of the gas pressure. With plastics injection molding machines, on the other hand, it is the pressure in the mold cavity itself firstly, secondly the pressure obtaining in the nozzle, that are of interest for monitoring and controlling the injection process. Here, too, the high temperature of the medium may complicate pressure measuring, as the transducer diaphragm may be damaged, for example, Moreover, when a transducer is fitted into a hole, there is usually a dead volume between the transducer and the tubular body at the diaphragm part, into which the fluid plastic penetrates and solidifies partially. This is equally detrimental to the accuracy of the measurement as it is to the quality of the molding. In all cases, the mechanical stresses due to temperature variations in time and place may falsify the measurement of the pressure inside molds and tubes.

For measuring pressure in fuel injection lines on engines, sensors located in the medium and measuring its pressure directly are employed for the most part. Fitting the pressure measuring instrumentation presents problems where the lines are to be monitored not continuously but only intermittently. The pipework system must then be opened every time to screw the measuring device into the line, which may cause the whole system to leak. Opening and screwing up the systems is also a complicated and time-consuming operation. For this application DE-OS 26 49 358 proposes an improvement in that the pressure is measured not directly but indirectly, a part of the wall with reduced thickness being deformed elastically by the inside pressure in the manner of a diaphragm, this deformation being transmitted to a transducer. But this solution likewise does not take into account the fact that hot media cause mechanical stressing of the walls due to temperature variation, which may falsify the measured result. Furthermore, over wide ranges there is no linear correlation between the deformation of this wall part and the internal pressure to be measured, so that calibration is very laborious.

In EP 0 041 599 a transducer is presented having a thin front plate adapted to the outer shape of the tube instead of a diaphragm. Here again, however, adaptation to the tube form may be laborious. Moreover, the pressure transmission is not as good as on a transducer with diaphragm. On thin tubes the circumference must be enlarged by adding tubular bodies, so that the above-mentioned sleeve-shaped pressure transducer can be adapted to the front plate, whose curvature radius cannot be reduced at will. This makes adaptation more complicated, while the pressure transmission is poorer still.

The transducers mentioned so far assure neither a linear correlation between the gas or liquid pressure (or at least between the difference of inside and outside pressure) and the measured variable over a wide measuring range, nor do they compensate adequately the measuring errors due to temperature gradients and interference voltages in the material. The purpose of the present invention is to overcome these disadvantages. The solution involves detecting the mechanical stresses set up by the pressure at one point at least along the longitudinal axis of the tubular body, in the radial and tangential directions, by means of electromechanical transducers. The output signals of the transducers representing the radial and tangential stresses are processed by subtracting the output signals with like polarity of the transducers and adding them with unlike polarity, so that a measuring signal proportional to the difference between the inside and outside pressures is obtained, which can be fed to a signal evaluation facility for further evaluation.

The device according to the invention is distinguished by at least one pair of electromechanical transducers arranged at one point at least along the longitudinal axis of the tubular body, in order to detect the mechanical stresses set up by the pressure in the radial and tangential directions and to generate analog output signals for the radial and tangential stresses, and a signal processing facility accepting the output signals from the transducers, for creating a measuring signal proportional to the difference between the inside and outside pressures, which may be fed to a signal evaluation facility for further evaluation.

With like polarity of the electromechanical transducers, the signal processing facility may comprise a subtraction circuit, and with unlike polarity an addition circuit.

The electromechanical transducers may be so-called longitudinal measuring pins, i.e., transducers sensitive to stressing in their longitudinal direction, or transverse measuring pins sensitive to stressing in their transverse direction.

A further development of the invention is distinguished by the electromechanical transducers being arranged in a sensing element which can be fitted into the tubular body as a separate intermediate piece.

BRIEF DESCRIPTION OF THE DRAWINGS

These and other objects, features and advantages of the present invention will become more apparent from the following description when taken in connection with the accompanying drawing which shows, for purposes of illustration only, several embodiments in accordance with the present invention, and wherein:

FIG. 8 shows a modified measuring rig according to the invention, with a sensing element in the form of a separate intermediate piece interposed in the tubular body.

DETAILED DESCRIPTION OF THE DRAWINGS

Figure 1:
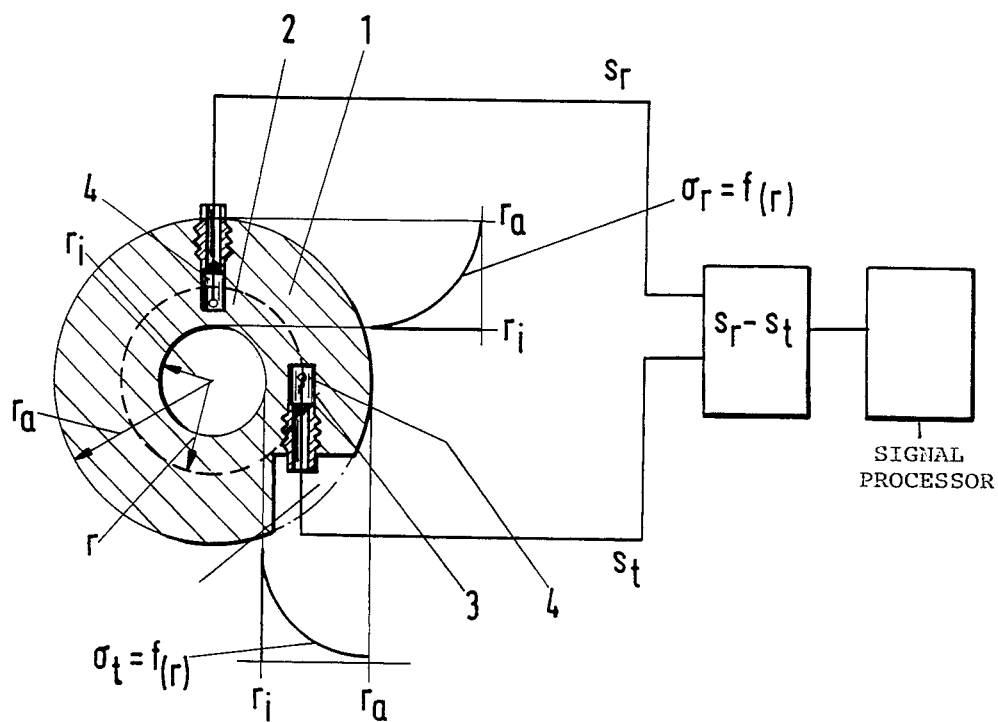
FIG. 1 shows in cross section a tube with radial and tangential holes to take an electromechanical transducer in the form of a longitudinal measuring pin, and schematically the associated signal processing facility according to one embodiment of the invention.

FIG. 1 shows the cross section through a tube at a certain point along its length. The pressure inside it $p_i$ is to be determined. The outside and inside diameters of the tube are designated $r_a$ and $r_i$, respectively. Inserted in a radial hole 2 is a transducer (longitudinal measuring pin) 4, which measures the stresses in the longitudinal direction of the hole, i.e., the radial stresses $\sigma_r$. A longitudinal measuring pin of this kind is shown later in detail in FIG. 3, and is described in the corresponding text. Inserted in a tangentially disposed hole 3 likewise is a longitudinal measuring pin 4. A recess 5 milled into the tube circumference assists inserting the pin into the hole and fitting it properly to stop. Also shown in this figure is the typical curve of the radial stress versus radial distance from the tube axis $\sigma_r = f(r)$, also the typical curve of the tangential stress $\sigma_t = f(r)$. An explanation of these stress curves is given in the descriptions referring to FIGS. 5 to 7. For reasons of measuring accuracy and linearity it is advantageous to adjust the stress-sensitive measuring points of the transducers essentially at the same distance r from the longitudinal axis of the tubular body. When using a longitudinal measuring pin therefore the depth of holes 2 and 3 should be chosen appropriately. When using a transverse measuring pin the depth may be adjusted on the pin itself In FIG. 1 the signal processing facility is shown also. The transducer 4 converts the radial mechanical stress $\sigma_r$ and the tangential stress $\sigma_z$ into electrical signals $s_r$ and $s_t$. In a signal processing facility the difference $s_r - s_t$ of the electrical signals is formed. If both transducers have like electrical polarity this difference may be formed by a subtraction circuit, or in the (preferred) case of unlike polarity by an addition circuit. The resulting signal is accepted by an evaluation facility, which may consist of a measuring instrument. This then displays the difference between the inside and outside pressures of the tubular body. The evaluation facility may also be designed for process control however.

Figure 2:
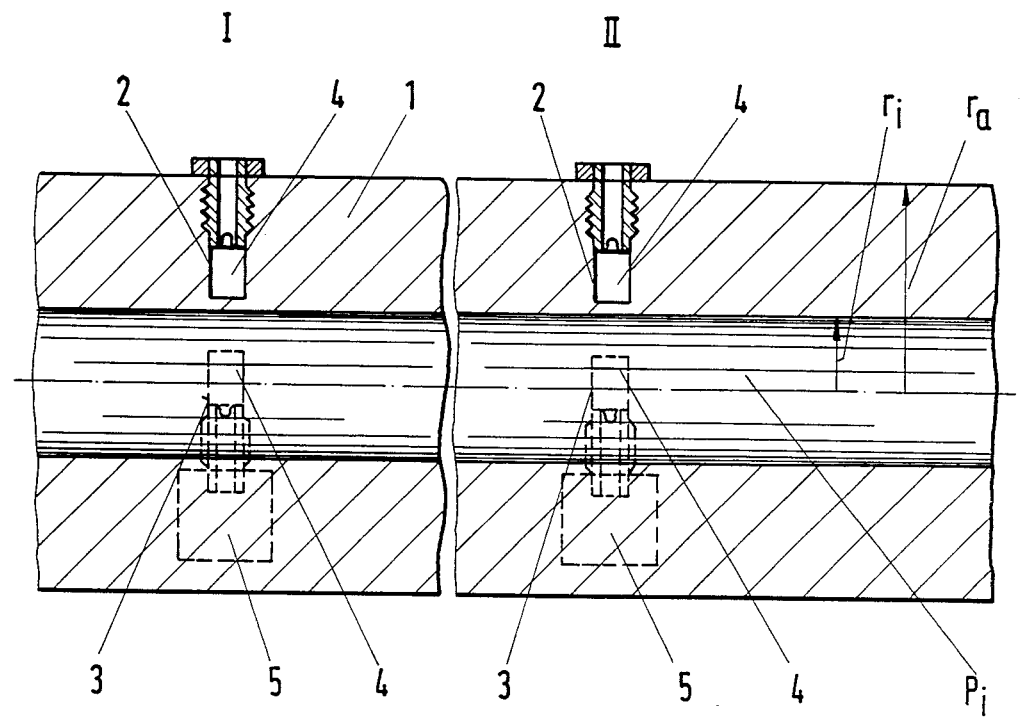
FIG. 2 shows in longitudinal section the tube shown in FIG. 1, with two measuring points provided along its longitudinal axis.

FIG. 2 shows a longitudinal section through the tube 1 shown in FIG. 1, having two measuring points I, II, each with one radial and one tangential hole 2, 3 (tangential hole in milled recess 5), each fitted with a longitudinal measuring pin 4. The numbers and symbols have the same meanings as in FIG. 1. The figure explains why when controlling an injection nozzle for example it is not enough to measure the inside pressure at only one point in the supply line; only the pressure behavior along a length enables the process to be controlled.

Figure 3:
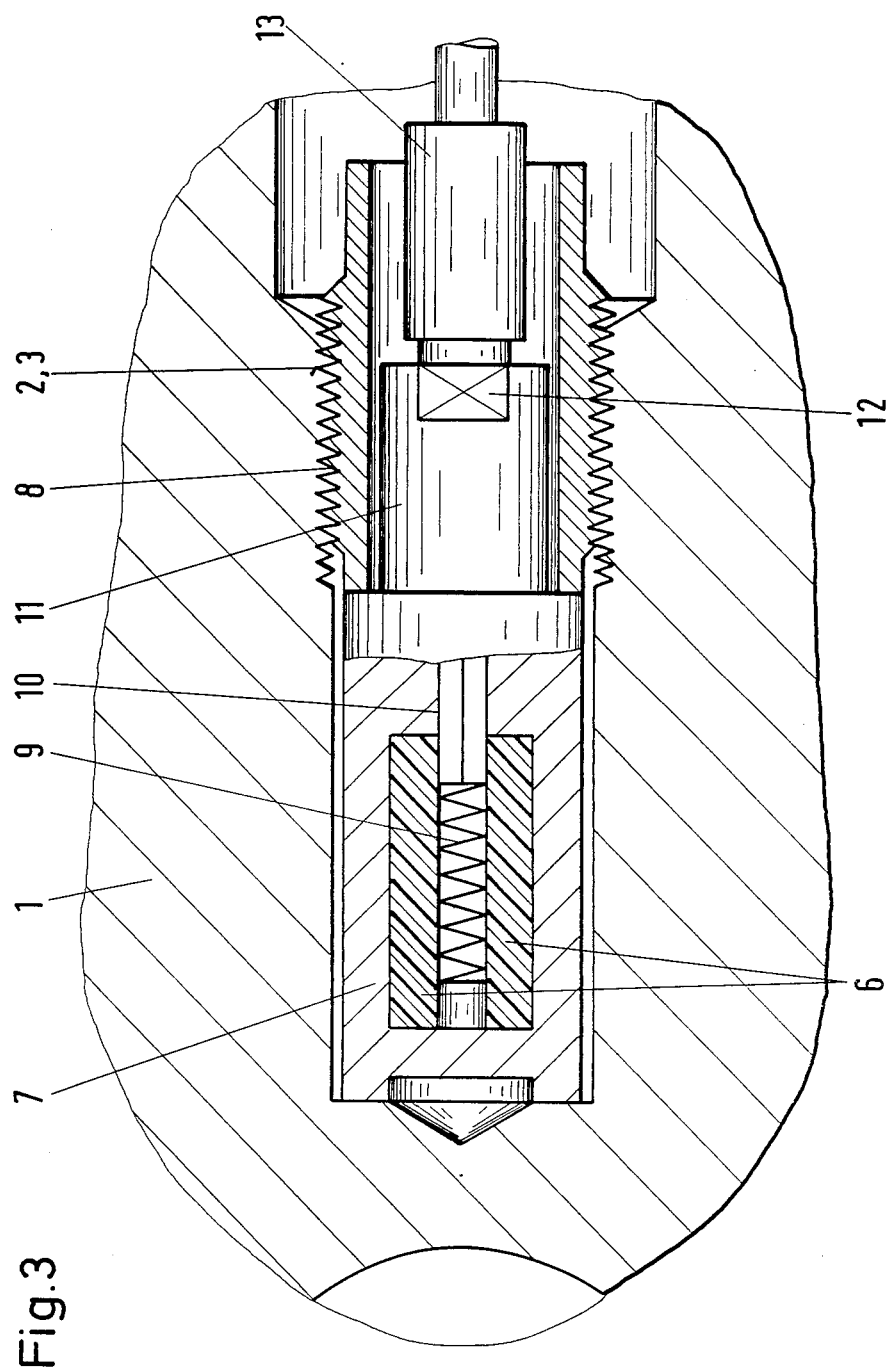
FIG. 3 shows in schematical longitudinally sectioned view a longitudinal measuring pin for the embodiment according to FIG. 1.

FIG. 3 shows schematically a longitudinal measuring pin as used in the embodiment of the invention described previously. This pin is inserted in radial or tangential holes 2, 3 of the tubular body 1 (shown in FIG. 1) whose inside pressure is to be measured.

A piezoelectric measuring element is employed preferentially, though a piezoresistive or strain gauge type may be used also. Important is a stable contact between the tubular body 1 and the measuring element 6 mainly in the longitudinal direction of the hole, so that the mechanical stresses acting in this direction can be transmitted (longitudinal measuring pin). In this direction the measuring element must be preloaded, too, so that both compressive and tensile stresses may be measured. Stable contact is obtained by pressing the bottom of the cylindrical enclosing body 7 containing the stress-measuring elements 6 firmly against its support by means of a thread 8, consisting of a male thread on the sleeve-shaped extension of the enclosing body and a female thread on the wall of holes 2, 3. This is accomplished typically by turning a screw head (not shown) while fitting the longitudinal measuring pin.

Through the same procedure the part of the measuring pin lying deeper in the hole is given the necessary mechanical preload, enabling both tensile and compressive stresses to be measured. Also shown in the drawing is the pick-up of the electrical charges by means of the conductor 9, and the lead-out of the signal-conducting cable 10 via plug socket 11, socket connection 12 and plug 13. Depending on the design of the stress-measuring element 6, the positive pole may be led out insulated while the negative pole is grounded, or vice versa. Under compressive loading, for example, this enables either a positive or negative signal to be led out. This capability is exploited meteorologically, as will be explained later with reference to FIG. 5.

The depth of the hole in which the longitudinal measuring pin is inserted determines the radial position of the measurement-sensitive point also. It is chosen so that the measurement-sensitive points of the radial and tangential measuring pins lie on the same circle with the radius r (see also FIG. 1).

There are many possibilities for designing a longitudinal measuring pin with or without preloading capability. Likewise, the signal lead-out and the attendant insulation problems may be solved in various ways. The embodiment described above is therefore a preferred one but only one of many embodiments of the longitudinal measuring pin according to the invention. The same is true of the transverse measuring pin shown in FIG. 4.

Figure 4:
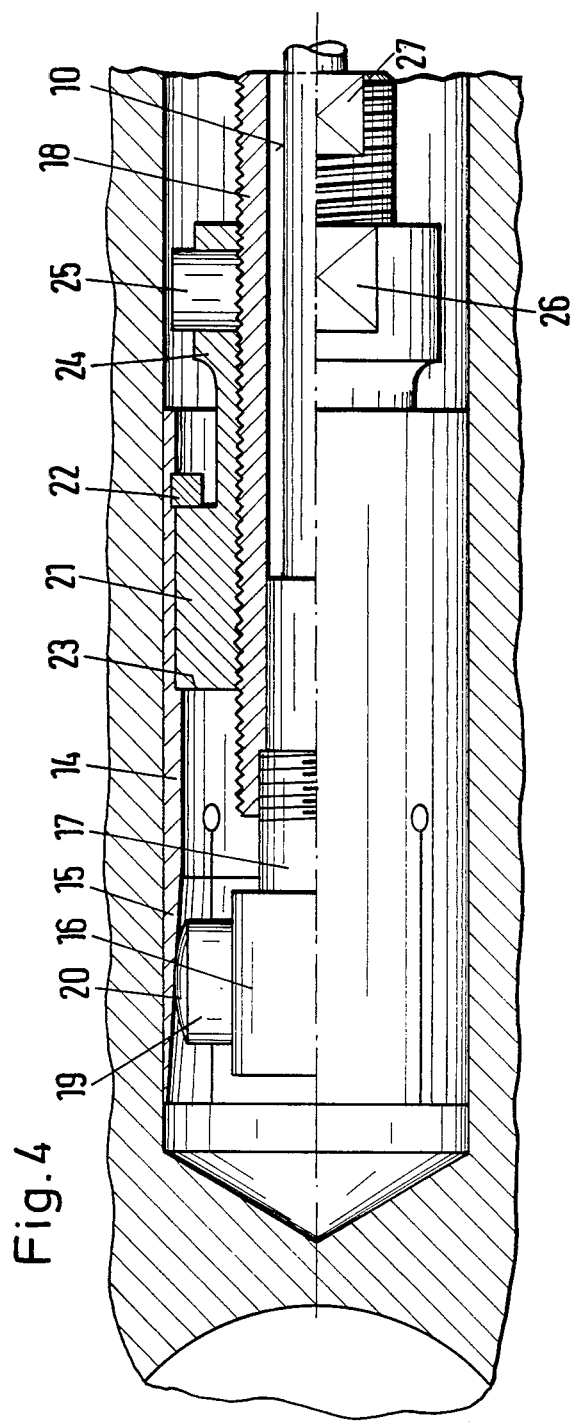
FIG. 4 shows schematically a transverse measuring pin (longitudinal section)

FIG. 4 shows schematically a transverse measuring pin, i.e. an element measuring stresses normal to its length. It is quite possible and in accordance with the invention to fix a transverse measuring pin in a radial hole, where it then measures the tangential stresses. Similarly an element of this kind may be fitted into a tangential hole, so that it measures the radial stresses. Through a measuring arrangement of this kind the same results can be obtained as with the arrangement of longitudinal measuring pins shown in FIG. 1, for example.

The transverse measuring pin shown as an example in FIG. 4 has as its outer enclosure a thin-walled cylindrical sleeve 14, with an inside taper 15 at one end of it. The stress-measuring element 6 consists of a housing 16 containing quartz plates, for example, to which a tubular fixing extension 17 with male thread 18 connects, and two diametrically opposite thrust bodies 19 each with a spherical end 20 for introducing force.

Through the cavity of the fixing extension 17, the electrical connecting lead is led out from the stress-measuring element 6. Arranged coaxially inside the sleeve 14 is a screw spindle 21, which is screwed onto the male thread of the fixing extension 17 and thus rigidly connected with the stress-measuring element 6. At the free end of the screw spindle 18 are two plane-parallel flats 27 for applying an auxiliary tool (not shown), e.g. in the form of a socket wrench, enabling the screw spindle 18 to be held at a certain angle of rotation from outside. For moving the screw spindle 21 axially, it has a moving nut 21 screwed onto it. This nut is guided radially on the inside of sleeve 14 and supported axially at both sides. Serving as thrust bearing are a spring ring 22 inserted in an annular groove on the sleeve 14, and a step 23. The moving nut 21 has a cylindrical collar 25, which projects beyond the outer thrust bearing 22. This collar 25 carries a radial pin 26, to which an auxiliary tool (not shown) may be applied for moving the measuring device axially and for turning the moving nut.

By turning the moving nut 21, the screw spindle 18, secured against turning with the auxiliary tool, may be displaced axially, so that the stress-measuring element 6 is drawn into the sleeve 14 and preloaded in the range of the inside taper 15, whereby the spherical ends 20 of the measuring element 6 act together with the inside taper 15 of sleeve 14 directly. In this way the entire measuring device is fixed axially inside the hole by friction contact between sleeve 14 and the side of the hole, and the measuring element 6 is preloaded at the same time. In the case of a thin-walled sleeve, made typically of drawn steel tubing, the form elasticity of this may under circumstances be sufficient to transmit outside the tension force exerted at only two diametrical points on the inside taper 15, without applying excessive force on the moving nut 21. For adjusting the desired radial distance of the stress-sensitive measuring point from the longitudinal axis of the tubular body and for adjusting the direction of maximum stress sensitivity in the azimuthal direction (see also description to FIG. 1), means (25, 26, 27) are available for holding the measuring device inside a hole in a certain axial position and angle of rotation.

Figure 5:
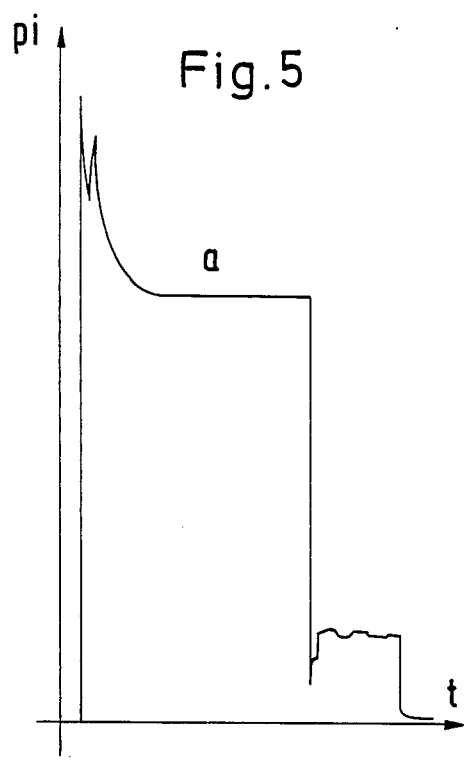
FIG. 5 graphs the pressure curve $p_i$ versus time t in an injection nozzle.

FIG. 5 shows the pressure versus time curve $p_i=f(t)$ in an injection nozzle for a plastics injection molding machine (curve 'a'). If the radial and tangential stress measurements plotted in FIG. 1 are performed in the wall of the injection nozzle, using longitudinal measuring pins as in FIG. 3, for example, in the case of a piezoelectric measuring element piezoelectric output signals are obtained with the time curves graphed in FIG. 6 (curve b: radial; curve c: tangential; $Q_r$, $Q_t$: electrical charges). If the radial and tangential output signals $Q_r$ and $Q_t$ are added, i.e. curves 6b and 6c, the curve plotted in FIG. 7 results, reproducing exactly the actual behavior in time of the inside pressure $p_i$ as graphed in FIG. 5 (or to be more accurate: $p_i-p_a$, with large $p_i$, $p_a$ disappears). Naturally the two signals mentioned are added by electrical means. Important is that during the experiment (i.e. injection), tensile and compressive stresses may (and actually do) obtain along the tube, as well as temperature variations, which do not affect the measured result significantly because their influence is compensated by adding the signals. Also important is the fact that the sum of the two signals (FIG. 7) represents the behavior of the pressure difference $p_i-p_a$ more accurately than either signal by itself (FIG. 6b for the radial, FIG. 6c for the tangential signal).

These circumstances are extremely useful in practice and will be explained below.

The formulas describing the stress distribution in a thick-walled tube exposed to an inside pressure $p_i$ and an outside pressure $p_a$ are set out in various engineers' handbooks, such as "Plasticity for Mechanical Engineers" by W. Johnson, published by Van Nostrand, Reinhold Company, London 1971, p. 157, formula 9.55.

For the difference between radial stress $_r$ and tangential stress $_t$ there emerges $$\sigma_r - \sigma_t = 2\,\frac{r_i^2 \cdot r_a^2\,(p_i - p_a)}{r_a^2 - r_i^2} \cdot \frac{1}{r^2}$$

where $r_i$ is the inside radius, $r_a$ the outside radius, r the selected measuring radius of the tubular body (represented by the broken line in FIG. 1), $p_a$ the outside pressure and $p_i$ the inside pressure.

Figure 7:
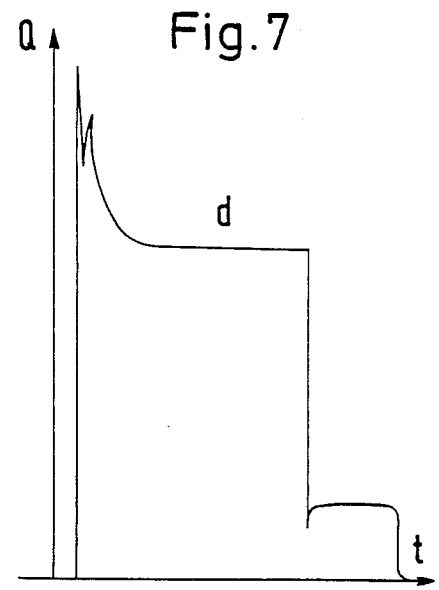
FIG. 7 graphs the sum of the radial and tangential piezoelectric output signals (charge Q)

The pressure difference is thus proportional to the stress difference $\sigma_r-\sigma_t$, which explains in principle the shape of curve d in FIG. 7 compared with that in FIG. 5 (curve for pressure difference $p_i-p_a$, whereby with comparatively high inside pressure $p_i$ the outside pressure $p_a$ may be ignored in comparison with the stress difference curve $\sigma_r-\sigma_t$). Moreover in accordance with the formula above it is sufficient to measure the radial and tangential stresses at the same radius r to obtain proportionality between pressure difference and stress difference. Which radius is chosen is immaterial in this respect.

Proportionality between the pressure difference and the radial or tangential stress alone is not given. It is thus a unique advantage of the invention that by employing the above formula and a measuring arrangement to measure the radial and tangential stresses in a tubular body, proportionality is obtained between the difference of the radial and tangential stresses and the difference between the inside and outside pressures.

If the pressure inside a tubular body exceeds the pressure outside, radial compressive (i.e. negative) stresses and tangential tensile (i.e. positive) stresses are sustained. The difference subtraction $\sigma_r-\sigma_t$ may thus be regarded as the addition of a radial compressive and a tangential tensile stress if the sign of the compressive stress is reversed. This can be done by reversing the polarity of the piezoelectric output signals.

Figure 6:
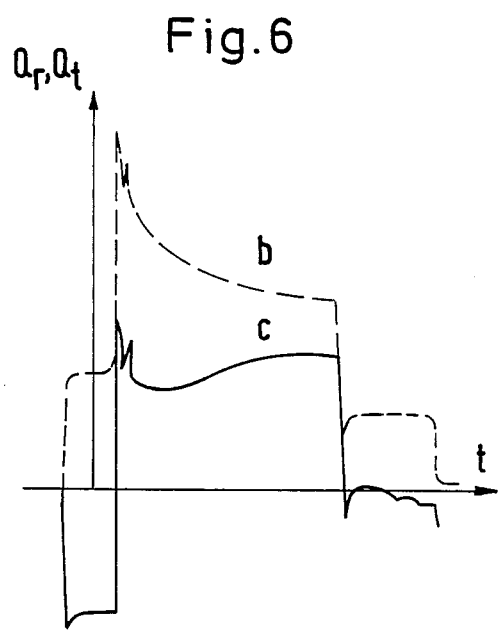
FIG. 6 graphs the radial and tangential piezoelectric output signals (charges $Q_r$, $Q_t$) versus time t.

This is made clear in FIGS. 6 and 7, where curve d of FIG. 7 is formed by adding the radial (broken curve b) and tangential (solid curve c) piezoelectric signals plotted in FIG. 6.

Another consequence of the difference $\sigma_r-\sigma_t$ is that all additional stresses acting similarly on the radial stress $\sigma_r$ and tangential stress $\sigma_t$ disappear essentially, because they appear at the subtraction in the minuend and subtrahend. Stresses due to temperature gradients are included here. Longitudinal stresses also (both compressive and tensile) play virtually no part owing to the formation of the piezoelectric output signals described above.

FIG. 8 shows another measuring arrangement according to the invention which has considerable practical importance. It differs from that of FIG. 1 mainly in that the radial and tangential electromechanical transducers 4 are located not directly on the tubular body 1 but in a sensing element 28, in the form of a separate tubular intermediate piece interposed in the tubular body 1. As shown, the radial and tangential holes 2, 3 with the appropriate electromechanical transducers (here in the form of longitudinal measuring pins, though other types may be used also) are provided in the tubular intermediate piece, as well as the recess 5 milled in the circumference analogous to FIG. 1. The sensing element according to FIG. 8 can be calibrated separately and retrofitted. Fitting (shown only schematically) may be done, for example, by means of threads provided on the tubular body 1 and sensing element 28. Between the tubular body 1 and the sensing element 28 is a suitable seal, such as the 0-rings shown in FIG. 8. Further details may be obtained from FIG. 1 and the relevant description.

According to the invention, the radial and tangential stresses can be measured with both longitudinal and transverse measuring pins. Needless to say the invention is not confined to the example of the injection molding nozzle described, but applies to pressure measuring in all tubular bodies. This includes ballistic and hydraulic applications among others. Nor is the invention restricted to piezoelectric transducers. Piezoresistive or strain gauges may be employed. It should be noted that in these cases too subtraction $\sigma_r - \sigma_t$ can be converted into an addition of electrical signals by reversing the electrical polarity of the output signals from the preamplifier.

The present invention makes it possible for the first time to measure the difference between inside and outside pressures on a tubular body as the linear function of an electrical output signal, and to eliminate the disturbing influences of temperature gradients and longitudinal stresses. The elimination of temperature influence (and the longitudinal stresses associated with them) is necessary especially when working with higher temperatures, as, for example, on engine injection pumps, injection nozzles or the other hydraulics of plastics injection molding machines, as well as ballistic applications. In these applications particularly, the temperature influence sets up longitudinal stresses too indirectly, which are virtually eliminated by the same measuring arrangement and the same measuring procedure.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A method for measuring the pressure in a tubular body, comprising the steps of detecting the stresses set up by the pressure at one position at least along the longitudinal axis of the tubular body in the radial and tangential directions by means of electromechanical transducers, and signal processing the output signals from the transducers representing the radial and tangential stresses in such a manner that the output signals are subtracted with like polarity of the transducers and added with unlike polarity, so that a measuring signal proportional to the difference between the inside and outside pressures is obtained, which can be fed to a signal evaluation facility for further evaluation.

2. A method according to claim 1, wherein the stresses in the radial and tangential directions are detected at essentially the same radial distance from the longitudinal counterline axis of the tubular body.

3. A method according to claim 2, wherein essentially radial and tangential holes are provided in the wall of the tubular body to accommodate the transducers.

4. A method according to claim 3, wherein for longitudinally sensitive transducers, holes are provided down to a depth essentially equal to the radial distance.

5. A method according to claim 3, wherein transversely sensitive transducers are adjusted to the radial distance by displacing them longitudinally and/or rotating them in relation to the holes.

6. A method according to claim 1, wherein essentially radial and tangential holes are provided in the wall of the tubular body to accommodate the transducers.

7. A method according to claim 6, wherein for longitudinally sensitive transducers, holes are provided down to a depth essentially equal to the radial distance.

8. A method according to claim 6, wherein transversely sensitive transducers are adjusted to the radial distance by displacing them longitudinally and/or rotating them in relation to the holes.

9. A device for measuring the pressure in a tubular body, comprising at least one pair of electromechanical transducer means arranged at one position at least along the longitudinal axis of the tubular body, for detecting the mechanical stresses set up in the radial and tangential directions by the pressure and for generating analog output signals for the radial and tangential stresses, and signal processing means receiving the output signals from the transducer means for generating a measuring signal proportional to the difference between the inside and outside pressures, which can be fed to a signal evaluation means for further evaluation.

10. A device according to claim 9, wherein the signal processing means includes a subtraction circuit for like polarity of the electromechanical transducer means.

11. A device according to claim 9, wherein the signal processing means includes an addition circuit for unlike polarity of the electromechanical transducer means.

12. A device according to claim 9, wherein the electromechanical transducer means are sensitive to stress in their longitudinal direction.

13. A device according to claim 12, wherein the signal processing means includes a subtraction circuit for like polarity of the electromechanical transducer means.

14. A device according to claim 12, wherein the signal processing means includes an addition circuit for unlike polarity of the electromechanical transducer means.

15. A device according to claim 9, wherein the electromechanical transducer means are of piezoelectric, piezoresistive or strain gauge type.

16. A device for measuring the pressure in a tubular body, comprising:
   at least one pair of electromechanical transducer means arranged at one position at least along the longitudinal axis of the tubular body, for detecting the mechanical stresses set up in the radial and tangential directions by the pressure; and for generating analog output signals for the radial and tangential stresses,
   the electromechanical means being sensitive to the stress normal to their longitudinal direction and;

signal processing means receiving the output signals from the transducer means for generating a measuring signal proportional to the difference between the inside and outside pressures, which can be fed to a signal evaluation means for further evaluation.

17. A device according to claim 16, wherein the signal processing means includes a subtraction circuit for like polarity of the electromechanical transducer means.

18. A device according to claim 16, wherein the signal processing means includes an addition circuit for unlike polarity of the electromechanical transducer means.

19. A device for measuring the pressure in a tubular body, comprising at:
least one pair of electromechanical transducer means arranged at one position at least along the longitudinal axis of the tubular body, for detecting the mechanical stresses set up in the radial and tangential directions by the pressure, and for generating analog output signals for the radial and tangential stresses,
the electromechanical means being are arranged in a sensing element which can be fitted into the tubular body as a separate intermediate piece and;
signal processing means receiving the output signals from the transducer means for generating a measuring signal proportional to the difference between the inside and outside pressures, which can be fed to a signal evaluation means for further evaluation.

20. A device according to claim 19, wherein the electromechanical transducer means are of piezoelectric, piezoresistive or strain gauge type.

21. A device for measuring the pressure in a tubular body, comprising at least one pair of electromechanical transducer means arranged at one position at least along the longitudinal axis of the tubular body, for detecting the mechanical stresses set up in the radial and tangential directions by the pressure and for generating analog output signals for the radial and tangential stresses, and signal processing means receiving the output signals from the transducer means including at least one of a subtraction circuit for like polarity of the electromechanical means and an addition circuit for unlike polarity of the electromechanical means for generating a measuring signal proportional to the difference between the inside and outside pressures, which can be fed to a signal evaluation means for further evaluation.

* * * * *